US007519786B2

(12) United States Patent
Sekine et al.

(10) Patent No.: US 7,519,786 B2
(45) Date of Patent: Apr. 14, 2009

(54) STORAGE SYSTEM, STORAGE ACCESS RESTRICTION METHOD AND COMPUTER PROGRAM PRODUCT

(75) Inventors: Kenji Sekine, Odawara (JP); Dai Taninaka, Odawara (JP); Keishi Tamura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 201 days.

(21) Appl. No.: 11/237,888

(22) Filed: Sep. 29, 2005

(65) Prior Publication Data
US 2007/0033358 A1 Feb. 8, 2007

(30) Foreign Application Priority Data
Aug. 4, 2005 (JP) .............................. 2005-227278

(51) Int. Cl.
G06F 12/14 (2006.01)
G06F 12/00 (2006.01)
(52) U.S. Cl. ..................... 711/163; 711/170; 711/203
(58) Field of Classification Search .................. 711/163, 711/170, 203
See application file for complete search history.

(56) References Cited
U.S. PATENT DOCUMENTS 7,240,167 B2 * 7/2007 Shirogane et al. ........... 711/148
2004/0054866 A1 * 3/2004 Blumenau et al. ........... 711/202
2005/0071559 A1 * 3/2005 Tamura et al. .............. 711/117

FOREIGN PATENT DOCUMENTS

| EP | 1 357 476 A  * | 4/2003 |
| EP | 1 517 230 A2 | 2/2004 |
| EP | 1 548 563 A1 * | 4/2004 |
| JP | 2004-102374 | 9/2002 |
| JP | 2005-115581 | 10/2003 |

OTHER PUBLICATIONS

Weber, R., "Information technology-SCSI Primary Commands-2 (SPC-2)", dpANS Project T10/1236-D, Jul. 18, 2001, Total Pages 36.
European Search Report Dated Nov. 29, 2006.
European Office Action dated Aug. 26, 2008.*
European Search Report of EP 1 548 563 A1 dated Apr. 5, 2005.*

* cited by examiner

*Primary Examiner*—Hyung S Sough
*Assistant Examiner*—Mardochee Chery
(74) *Attorney, Agent, or Firm*—Reed Smith LLP; Stanley P. Fisher, Esq.; Juan Carlos A. Marquez, Esq.

(57) ABSTRACT

Provided is a storage system having one or more logical devices mapped to a virtual device provided in a mapping destination storage system, and a storage controller for controlling the reading and writing of data from and to the logical devices. Upon receiving a reserve command from the mapping destination storage system, the storage controller restricts the access from an initiator other than the mapping destination storage system to a logical device to which access restriction is designated with the reserve command.

13 Claims, 14 Drawing Sheets

| Bit Byte | 7 | 6 | 5 | 4 | 3 | 2 | 1 | 0 |
|---|---|---|---|---|---|---|---|---|
| 0 | (MSB) | | | | | | | |
| 3 | | | Generation Counter | | | | | (LSB) |
| 4 | (MSB) | | | | | | | |
| 11 | | | Reservation Key | | | | | (LSB) |
| 12 | | | | Type | | | | |
| 13 | | | | State | | | | |
| 14 | (MSB) | | | | | | | |
| 15 | | | Reserve | | | | | (LSB) |
| 16 | (MSB) | | | | | | | |
| 23 | | | Response Information | | | | | (LSB) |
| 24 | (MSB) | | | | | | | |
| 31 | | | WWN | | | | | (LSB) |
| 32 | (MSB) | | | | | | | |
| 39 | | | Reserve | | | | | (LSB) |

MAPPING TABLE 151

| VDEV | EXTERNAL DEVICE INFORMATION | | | PATH INFORMATION | |
| --- | --- | --- | --- | --- | --- |
| | DEVICE IDENTIFYING INFORMATION | CAPACITY (KB) | DEVICE TYPE | WWN | LUN |
| 0 | DRFGTFNEIEK | 657,456 | DISK | 0xAABBCCDD | 0 |
| 1 | ADRFGTFNEIE | 89,854 | DISK | 0xAABBEEFF | 3 |
| 2 | GGRRFFDDERT | — | TAPE | 0x445566AAB | 5 |

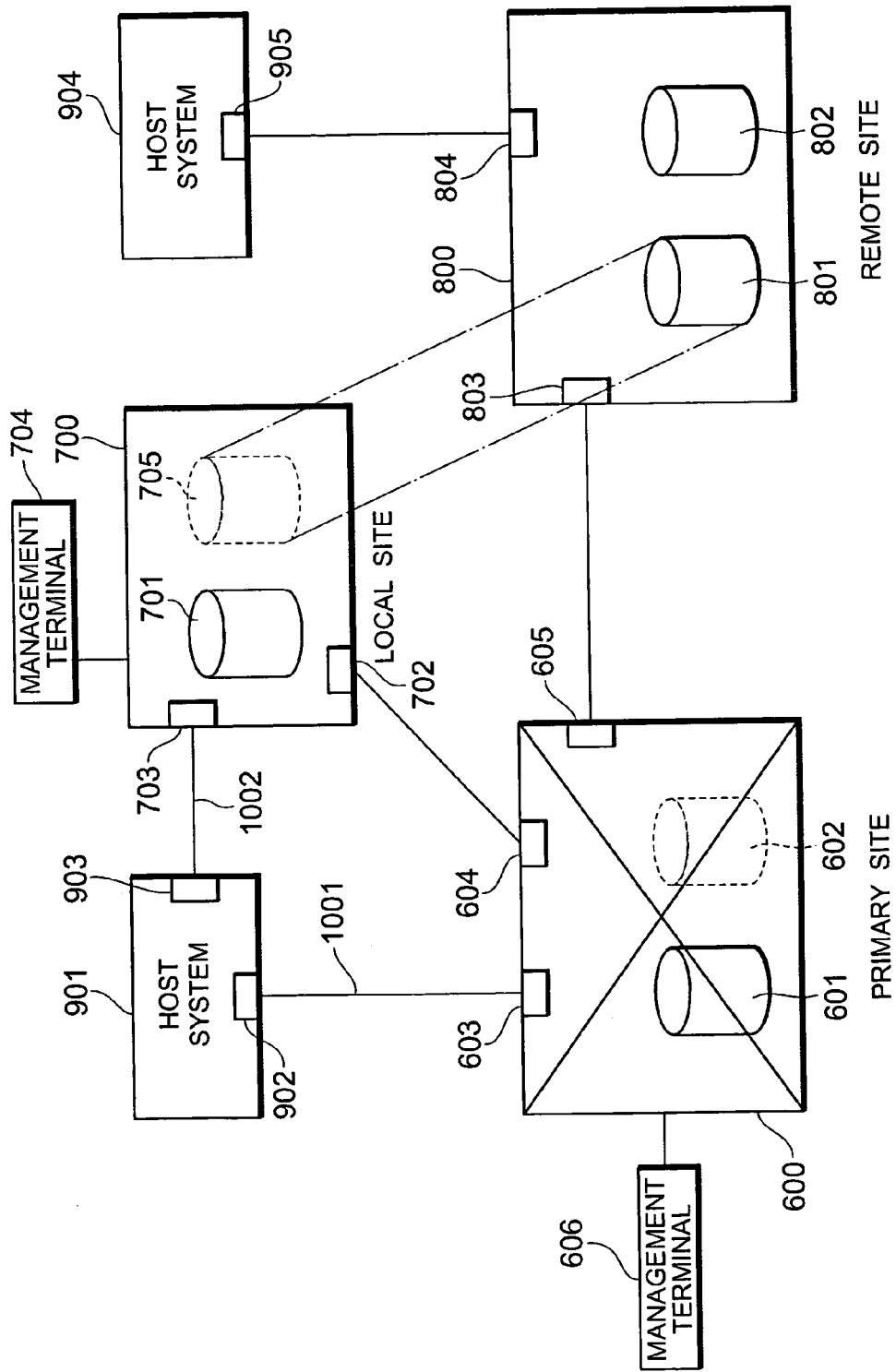

STORAGE SYSTEM, STORAGE ACCESS RESTRICTION METHOD AND COMPUTER PROGRAM PRODUCT

CROSS-REFERENCES TO RELATED APPLICATIONS

This application relates to and claims priority from Japanese Patent Application No. 2005-227278, filed on Aug. 4, 2005, the entire disclosure of which is incorporated herein by reference.

BACKGROUND

The present invention relates to a storage system, storage access restriction method and computer program product.

With a conventional information processing system, data is stored in a storage system directly connected to a host system. Thus, in order to access data of a storage system where a certain host system is directly connected to another host system, it is necessary to hook up with the storage system via the other host system. In reality, pursuant to the advancement of network technology and the exponential increase in the data volume to be handled by storage systems in recent years, distribution of the host system performing data processing and the storage system storing data has advanced, and a network storage where a plurality of host systems are connected to the storage system via a network to enable each of the host systems to share information has been developed.

As examples of a network storage, there are a SAN storage which connects the host system and storage system via a SAN (Storage Area Network) and provides block access service to the host system, a NAS (Network Attached Storage) which connects the host system and storage system via an IP network or Infiniband and provides file access service to the host system, and a Web storage which connects the host system and storage system via the Internet or the like, and provides Web access service via HTTP (Hyper Text Transfer Protocol) protocol or an expanded protocol thereof.

Pursuant to the diffusion of network storages, a system administrator needs to manage the access path on the network. Japanese Patent Laid-Open Publication No. 2005-115581 and Japanese Patent Laid-Open Publication No. 2004-102374, for instance, refer to the path management of a storage network.

SUMMARY

Meanwhile, as a mode of connecting the storage network, the present inventors are examining the technology of connecting a first storage system to be connected to a first host system and a second storage system to be connected to a second host system and mapping an actual device of the second storage system to a virtual device of the first storage system so that the first storage system is able to provide the actual device, as though its one's own internal volume, to the first host system.

In this kind of connection mode, when writing of data into the actual device of the second storage system from the second host system is authorized, there is a problem in that the compatibility of data in the actual device will not be guaranteed.

Thus, an object of the present invention is to provide compatibility to the data in the logical device mapped to the virtual device of the mapping destination storage system.

In order to achieve the foregoing objects, the storage system of the present invention has one or more logical devices mapped to a virtual device provided in a mapping destination storage system, and a storage controller for controlling the reading and writing of data from and to the logical devices. Upon receiving a reserve command from the mapping destination storage system, the storage controller restricts the access from an initiator other than the mapping destination storage system to a logical device to which access restriction is designated with the reserve command.

Upon receiving a reserve command from the mapping destination storage system, the storage controller restricts the access from an initiator other than a reserved port by associating the logical device to which access restriction is designated with the reserve command and a port of the mapping destination storage system.

Preferably, upon receiving a reserve command containing a second password from an initiator other than the mapping destination storage system in a case where a reserve command containing a first password from the mapping destination storage system is received, the storage controller authorizes the access from an initiator other than the mapping destination storage system to a logical device (logical device to which access restriction is designated by the mapping destination storage system) subject to the first password coinciding with the second password. This will enable a more adaptable access restriction.

As a reserve command, for instance, a SCSI command may be used. As a command for designating the access restriction, by using a reserve command of a versatile SCSI protocol, access restriction can be implemented easily without having to equip the storage system with a special function so as long as it is a SCSI device.

The storage access restriction method of the present invention is a method of controlling the access to a storage system having one or more logical devices mapped to a virtual device provided in a mapping destination storage system, and a storage controller for controlling the reading and writing of data from and to the logical devices. This method has the steps of the storage controller receiving a reserve command from the mapping destination storage system; and restricting the access from an initiator other than the mapping destination storage system to a logical device to which access restriction is designated with the reserve command.

The computer program product of the present invention has a computer program for causing a storage controller to execute access restriction to a storage system having one or more logical devices mapped to a virtual device provided in a mapping destination storage system, and the storage controller for controlling the reading and writing of data from and to the logical devices. This computer program causes the storage controller to execute the steps of: the storage controller receiving a reserve command from the mapping destination storage system; and restricting the access from an initiator other than the mapping destination storage system to a logical device to which access restriction is designated with the reserve command.

This computer program, for instance, may be installed in the storage system, or may be stored in a recording medium. As such recording medium, for example, the likes of an optical recording medium (a recording medium capable of optically reading data such as a CD-RAM, CD-ROM, DVD-RW, DVD-ROM, DVD-R, PD disk, MD disk or MO disk), a magnetic recording medium (a recording medium capable of magnetically reading data such as a flexible disk, magnetic card or magnetic tape) or a memory element (a semiconductor memory element such as a DRAM or a ferroelectric memory element such as an FRAM) may be used.

According to the present invention, compatibility of the data in the logical device mapped to the virtual device of the mapping destination storage system can be guaranteed.

DESCRIPTION OF THE DRAWINGS

FIG. 6 is an explanatory diagram of a mapping table;

FIG. 15 is a network configuration of the storage system according to Embodiment 3.

DETAILED DESCRIPTION

Embodiments of the present invention are now explained with reference to the respective drawings. The respective embodiments do not limit the scope of the claims, and features explained in the embodiments are not all necessarily required as means for solving the problems of the present invention.

Embodiment 1

Figure 1:
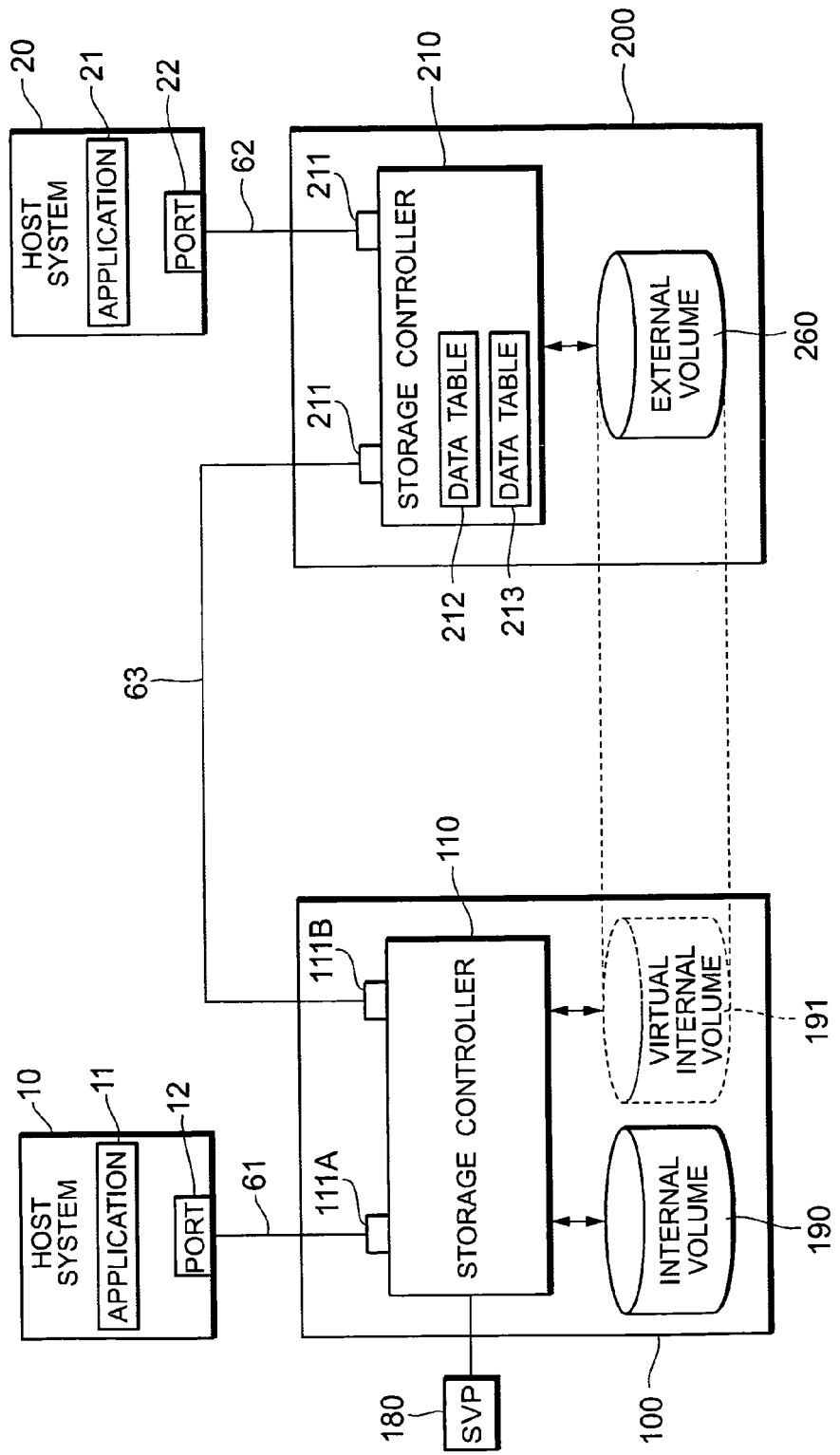
FIG. 1 is a network configuration of the storage system according to Embodiment 1.

FIG. 1 shows the network configuration of the storage system according to the present embodiment. A storage system 100 has a storage controller 110, a target port 111A, an initiator port 111B, a management terminal 180, an internal volume 190 and a virtual internal volume 191.

The internal volume 190 is an actual device formed on a physical memory device (for instance a disk drive) provided in the storage system 100. The virtual internal volume 191 is a virtual existence without an actual storage area, and the substance that stores data exists in an external volume 260 of a storage system 200. In other words, the virtual internal volume 191 is created as a result of the external volume 260 of the storage system 200 being mapped to the storage hierarchy of the storage system 100. Mapping is the association (or coordination) of the devices. The devices to be associated may be an actual device or a virtual device. The storage system 100 incorporates the external volume 260 as its own internal volume, and provides this as an LU (Logical Unit) to a host system 10.

The target port 111A is connected to the host system 10 via a communication network 61. The host system 10 is a business server system, workstation, mainframe, personal computer or the like. The host system 10 is equipped with an application program 11 such as database software, and a port 12 for communicating with the storage system 100.

As the host connected path 200, for instance, a LAN (Local Area Network), SAN (Storage Area Network), Internet, dedicated line, public line and so on may be arbitrarily used. When the host system 10 is to be connected to the storage system 100 via a SAN, the host system 10, according to a fibre channel protocol, requests the data input/output in block units, which is a data management unit of the memory resource of the storage system 100 based on a protocol such as NFS (Network File System). Meanwhile, when the host system 10 is to be connected to the storage system 100 via a LAN, the host system 10 will designate a file name and request data input/output in file units. In order to receive the file access request from the host system 10, the storage system 100 must be equipped with a NAS (Network Attached Storage) function. When the communication network 61 is a LAN, for example, a LAN-compatible network card will be used as the port 12. When the communication network 61 is a SAN, for example, an HBA (Host Bus Adapter) will be used as the port 12.

The initiator port 111B is an external port to be connected to the storage system 200 via a communication network 63. The initiator port 111B mainly performs the data transfer between the virtual internal volume 191 and external volume 260.

The management terminal 180 is a terminal device for maintaining or managing the storage system 100. By operating the management terminal 180, the system administrator, for instance, may set the logical device defined in the internal volume 190 or virtual internal volume 191, or change the RAID (Redundant Array of Independent Inexpensive Disks) configuration (for instance, change RAID level 5 to RAID level 1). Further, as described later, by operating the management terminal 180, the system administrator may also transmit a reserve command from the storage system 100 to the storage system 200. A reserve command is a command for designating access restriction, and the details thereof are prescribed with a SCSI (Small Computer System Interface) protocol.

Incidentally, the storage systems 100, 200 are both SCSI devices that operate based on the SCSI protocol.

The storage system 200 has a storage controller 210, a plurality of ports 211 and an external volume 260. The external volume 260 is an actual device formed on a physical memory device (for instance a disk drive) provided in the storage system 200. Since the external volume 260 exists outside when viewed from the storage system 100, this is referred to as an external volume as a matter of convenience. Nevertheless, in the sense that the external volume 260 exists inside the storage system 200, it is also an internal volume of the storage system 200.

Among the plurality of ports 211, a certain port is connected to the storage system 100 via the communication network 63, and another port is connected to a host system 20 via a communication network 62. The host system 20 has an application program 21 such as database software, and a port 22 for communicating with the storage system 200.

The storage controller 210 has data tables 212, 213. The data tables 212, 213 store information required for designating access restriction according to the reserve command that the storage system 200 receives from an initiator (for instance, the storage system 100 or host system 20).

Figures 2, 3:
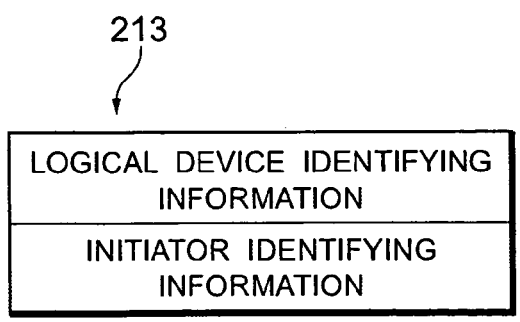
FIG. 2 is an explanatory diagram of a first data table.
FIG. 3 is an explanatory diagram of a second data table.

FIG. 2 shows the data table 212. The data table 212 includes Generation Counter, Reservation Key, Type, State, Reserve, Response Information, WWN and Reserve. Generation Counter is the number of times a reserve command is received from the initiator. Reservation Key is a password to be transmitted from the initiator together with the reserve command. Type is information for specifying the attribute of access restriction. State is flag information to be used other than the reserve command. Reserve is a dummy area. Response Information is information to be used other than the reserve command. WWN is the World Wide Name of the initiator port that issued the reserve command.

Incidentally, as the attribute of access restriction, there are Write Exclusive (no writing), Exclusive Access (no reading), Write Exclusive Registration Only (no writing other than the reserved initiator) and Exclusive Access Registration Only (no reading other than the reserved initiator).

FIG. 3 shows the data table 213. The data table 213 stores identifying information (for instance, Logical Unit Number) of the logical device to which access restriction is designated with the reserve command, and identifying information (for instance, SCSI-ID) of the initiator that issued the reserve command.

Figure 4:
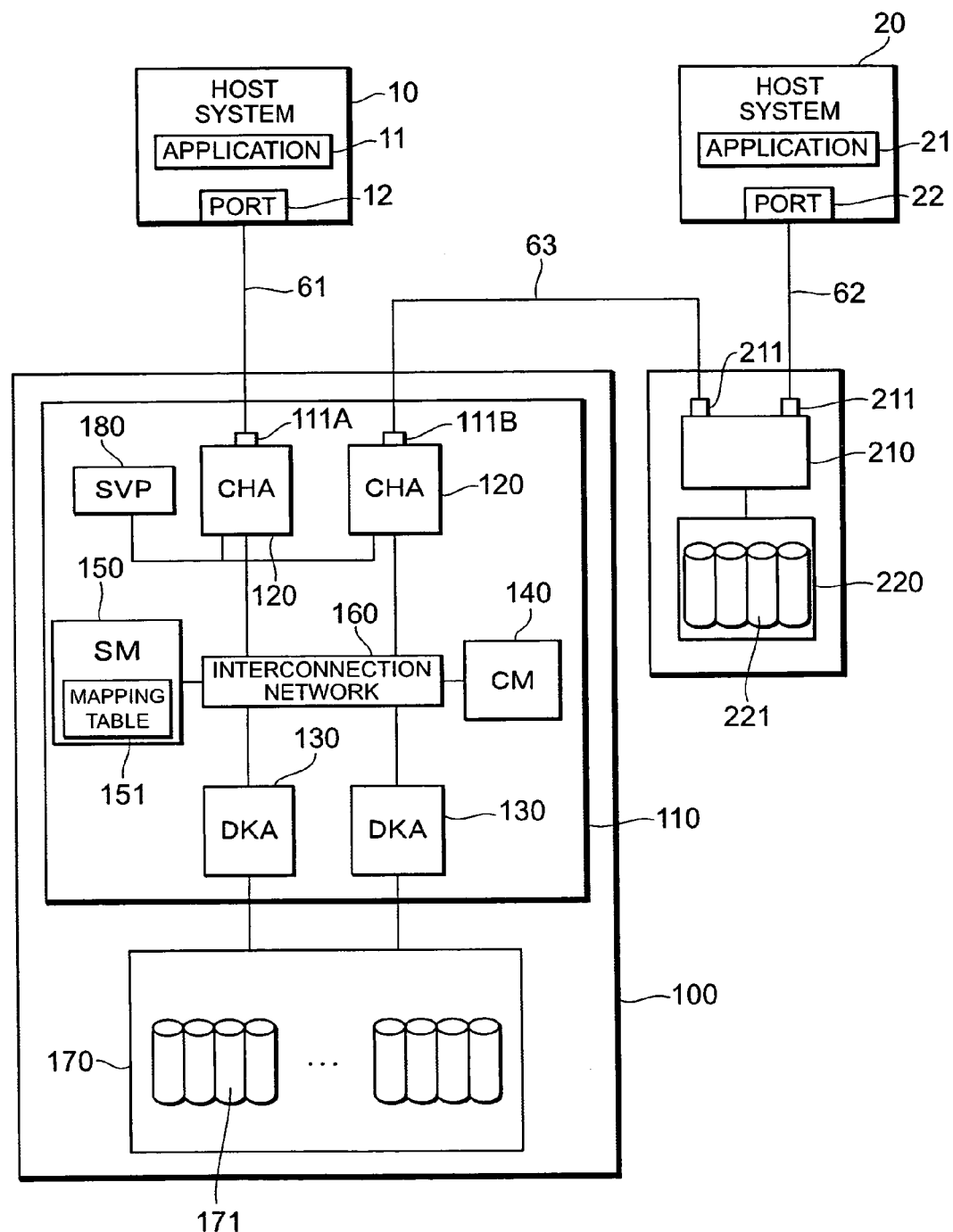
FIG. 4 is a detailed configuration of the storage system according to Embodiment 1.

FIG. 4 shows the detailed configuration of the storage system according to the present embodiment. Devices with the same reference numerals as those illustrated in FIG. 1 represent the same devices, and the detailed explanation thereof is omitted. The storage system 100 has a storage controller 110 and a storage apparatus 170. The storage controller 110 has a plurality of channel adapters (CHA) 120, a plurality of disk adapters (DKA) 130, a cache memory (CM) 140, a shared memory (SM) 150 and an interconnection network 160. The storage apparatus 170 has a plurality of physical devices 171.

Each channel adapter 120 is configured as a microcomputer system having the likes of a CPU and memory, and performs data communication with the host system 10. The channel adapter 120 has a target port 111A and an initiator port 111B. Each channel adapter 120 is assigned a unique network address (for example, an IP address or WWN), and may individually function as a NAS. When a plurality of host systems 10 exist, each channel adapter 120 individually accepts and processes the requests from the respective host systems 10.

Each disk adapter 130 is configured as a microcomputer having the likes of a CPU and memory, and controls the reading and writing of data from and to the physical device 171. Each disk adapter 130, for instance, writes the data that the channel adapter 120 received from the host system 10 or read from the storage system 200 into a prescribed address of a prescribed physical device 171. Further, each disk adapter 130 transmits the data read from the prescribed physical device 171 to the host system 10 or storage system 200. Each disk adapter 130 converts the logical address into a physical address when reading and writing data from and to the physical device 171. When the physical device 171 is managed according to a RAID configuration, each disk adapter 130 performs data access according to such RAID configuration. For example, each disk adapter 130 writes the same data into separate physical device groups (RAID groups), or performs parity operation and writes data and parity data into the physical device group.

The cache memory 140 temporarily stores the data received from the host system 100 or storage system 200, or temporarily stores the data read from the physical device 171.

The shared memory 150 stores configuration information (for instance, the mapping table 151 described later) of the storage system 100.

Incidentally, any one or more physical devices 171 may be used as a cache disk. Further, the cache memory 140 and shared memory 150 may be configured as separate memories, or a storage area of a part of the same memory may be used as the cache area, and the other area may be used as the control area.

The interconnection network 160 mutually connects the respective channel adapters 120, respective disk adapters 130, a cache memory 140 and a shared memory 150. The interconnection network 160, for instance, is a high speed bus such as an ultra high speed crossbar switch for performing data transmission based on high speed switching operations.

The physical device 171, for example, is a memory device with an actual storage area such as a hard disk drive, flexible disk drive, magnetic tape drive, semiconductor memory drive, optical disk drive or the like. Further, for instance, different types of disks such as an FC (Fibre Channel) disk and SATA (Serial AT Attachment) disk may coexist in the storage unit 170.

The storage system 200 has a storage controller 210 and a storage apparatus 220. The detailed configuration of the storage controller 210 is the same as the detailed configuration of the foregoing storage controller 110. The storage apparatus 220 has a plurality of physical devices 221.

Figure 5:
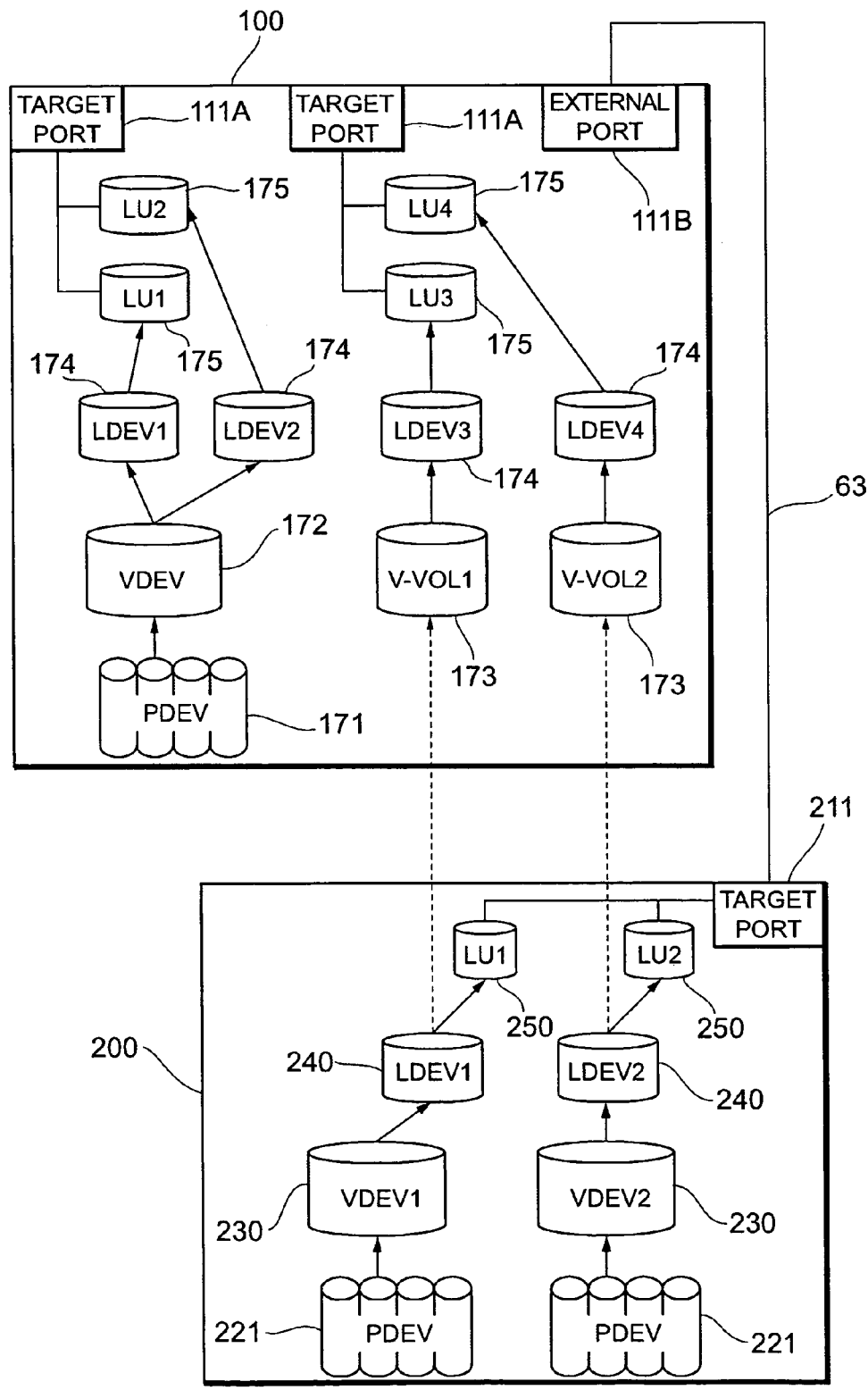
FIG. 5 is an explanatory diagram of the storage hierarchy configured in the respective storage systems.

FIG. 5 shows the storage hierarchy created in each storage system. The storage hierarchy in the storage system 100 may be broadly classified into a physical storage hierarchy and logical storage hierarchy. The physical storage hierarchy is configured from a physical device 171.

A logical storage hierarchy may be configured from a plurality of (for example, two types of) hierarchies. One logical hierarchy may be configured from a VDEV (Virtual Device) 172 and a virtual VDEV (hereinafter also referred to as a "V-VOL") treated as a VDEV 172. The other logical hierarchy may be configured from a LDEV (Logical Device) 174.

The VDEV 172, for example, is configured by grouping a prescribed number of physical devices 171, such as in a set of fours (3D+1P), or a set of eights (7D+1P). In other words, the storage areas provided respectively from the plurality of physical devices 171 belonging to the group are assembled to form a single RAID storage area, and this RAID storage area becomes the VDEV 172.

In contrast to the VDEV 172 being created on the physical device 171, the V-VOL 173 is a virtual intermediate storage device that does not require a physical storage area. The V-VOL 173 is not directly associated with a physical storage area, and is a virtual existence to become the receiver for mapping an LU (Logical Unit) of the storage system 200.

At least one or more LDEVs 174 may be provided on the VDEV 172 or V-VOL 173. The LDEV 174, for instance, may be configured by dividing the VDEV 172 in a fixed length. When the host 10 is an open host system, by the LDEV 174 being mapped with the LU 175, the host 10 will recognize the LDEV 174 as a single physical device. An open host can access a desired LDEV 174 by designating the LUN (Logical Unit Number) or logical block address. Incidentally, a mainframe host will directly recognize the LDEV 174.

The LU 175 is a device that can be recognized as a logical unit of SCSI. Each LU 175 is connected to the host 10 via the target port 111A. At least one or more LDEVs 174 may be respectively mapped to each LU 175. As a result of mapping a plurality of LDEVs 174 to a single LU 175, the LU size can be virtually expanded.

The storage system 200 has a plurality of physical devices 221, a VDEV 230 set on the storage area provided by the physical device 221, and at least one or more LDEVs 240 capable of being set on the VDEV 230. The LDEV 240 is mapped to the LU 250. LU 250 (i.e., LDEV 240) is mapped to a V-VOL 173, which is a virtual intermediate storage device, and may also be used from the storage system 100.

For example, the "LDEV 1", "LDEV 2" of the storage system 200 are respectively mapped to the "V-VOL 1", "V-VOL 2" of the storage system 100 via the "LU 1", "LU 2" of the storage system 200. And, "V-VOL 1", "V-VOL 2" are respectively mapped to the "LDEV 3", "LDEV 4", and respectively provided to the host system 10 as the "LU 3", "LU 4".

Incidentally, the VDEV 172 V-VOL 173 may adopt the RAID configuration. In other words, a single disk drive 171 may be assigned to a plurality of VDEVs 172, V-VOLs 173 (slicing), and a single VDEV 172, V-VOL 173 may be formed from a plurality of physical devices 171 (striping).

The "LDEV 1" or "LDEV 2" of the storage system 100 corresponds to the internal volume 190 depicted in FIG. 1. The "LDEV 3" or "LDEV 4" of the storage system 100 corresponds to virtual internal volume 191 depicted in FIG. 1. The "LDEV 1" or "LDEV 2" of the storage system 200 corresponds to the external volume 260 depicted in FIG. 1.

FIG. 6 shows a mapping table 151 for mapping the external volume 260 to the virtual internal volume 191. The mapping table 151 is configured by respectively associating the VDEV number for respectively identifying the VDE172, V-VOL 173, and the information of an external physical device 221 (external device information).

The external device, for instance, may be configured by including the device identifying information, memory capacity of the physical device 221, information showing type of physical device 221 (for instance, tape device/disk device), and path information to the physical device 221. Path information is constituted by including unique identifying information (WWN) of the respective ports 211 and the LUN for identifying the LU 250.

Incidentally, the device identifying information and WWN shown in FIG. 6 are values used as a matter of convenience for explanation, and do not correspond to the configuration illustrated in the other diagrams.

Here, returning to FIG. 1, an explanation is provided regarding the description of the storage access restriction method according to the present embodiment. In the present embodiment, access from the host system 20 to the external volume 260 is restricted by the storage system 100 issuing a reserve command (SCSI command) to the storage system 200.

Upon receiving a reserve command from the storage system 100, the storage system 200 registers the WWN of the initiator port 111B of the storage system 100 in the data table 212, and further registers the identifying information of the initiator that issued the reserve command and the identifying information of the logical device 240 to which access restriction is designated with the reserve command in the data table 213. By associating the logical device 240 to which access designated is designated and the initiator port 111B, the storage system 200 will exclusively limit the access to the logical device 240 from an initiator other than the reserved initiator port 111B.

The storage system 100 may designate either Write Exclusive or Exclusive Access as the access restriction with a reserve command that does not contain a password. In order to cancel this access restriction, it is necessary for the same initiator as the one that issued the reserve command to transmit a shared command to the target. In this example, it is necessary to transmit a shared command from the storage system 100 to the storage system 200.

Further, the storage system 100 may select either Write Exclusive Registration Only or Exclusive Access Registration Only as the access restriction with a reserve command containing a password. The password of the reserve command received by the storage system 200 is registered in the data table 212. In the case of access restriction with a reserve command containing a password, even if it is an initiator other than the one that issued the reserve command, such initiator may transfer the reserve right to oneself by transmitting a reserve command using the same password to the target.

For example, in a case where the storage system 200 receives a reserve command from the storage system 100 (as a matter of convenience, this is referred to as an old initiator) containing a password (as a matter of convenience, this is referred to as a first password), when the storage system 200 receives a reserve command containing a password (as a matter of convenience, this is referred to as a second password) from the host system 20 (as a matter of convenience, this is referred to as a new initiator), subject to the second password coinciding with the first password, the storage system 200 authorizes the access from the new initiator to the logical device 240 to which access restriction is designated with the old initiator. As a matter of convenience, the change of the substance that designates the access restriction from an old initiator to a new initiator as described above is referred to as the "transfer of reserve right".

Incidentally, after the reserve right of the storage system 200 is transferred from the storage system 100 to the host system 20, access from the storage system 100 to the storage system 200 will be restricted.

Figure 7:
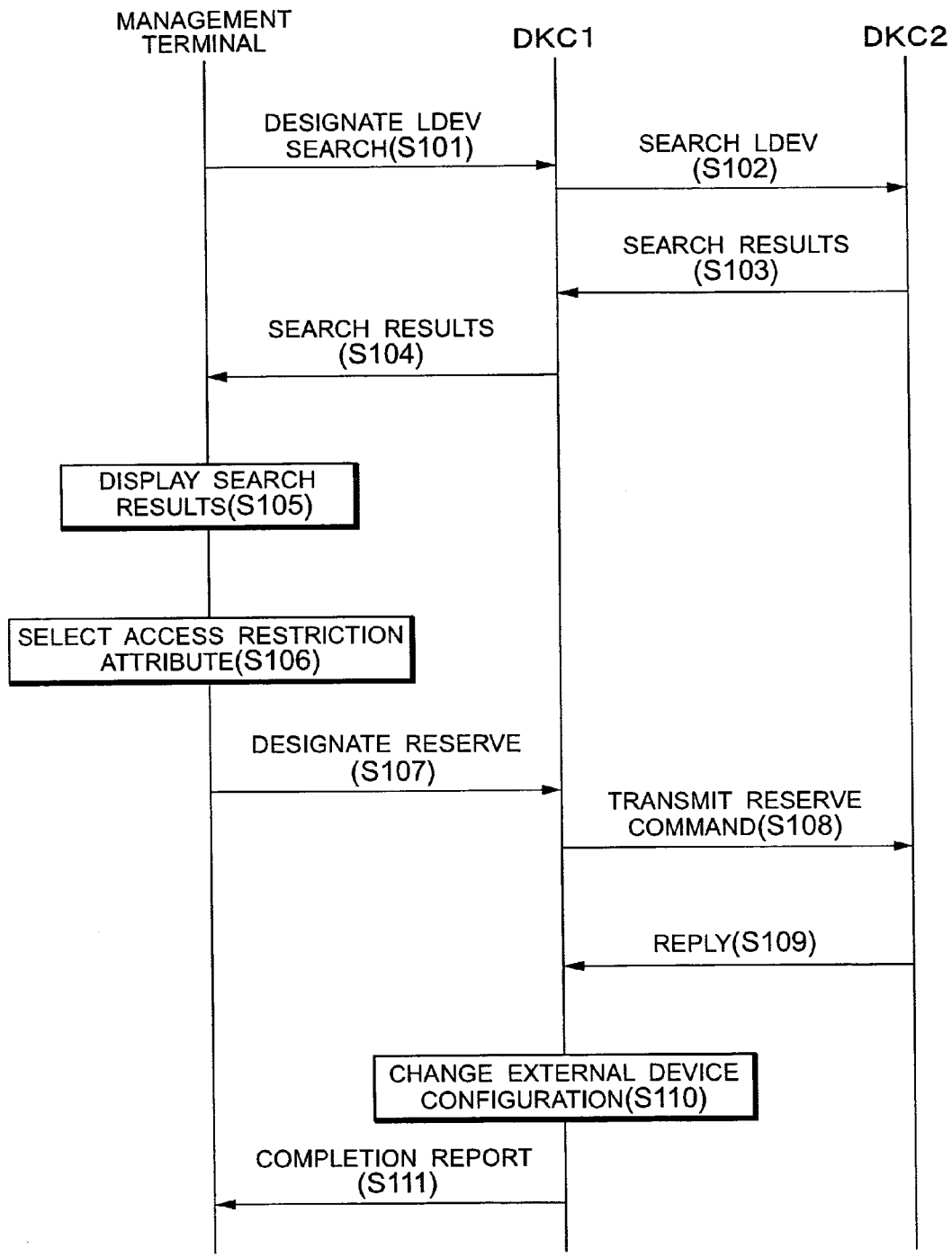
FIG. 7 is a sequence chart showing the procedures for setting the access restriction of a storage system.

FIG. 7 is a sequence chart showing the procedures for setting the access restriction of the storage system 200 using a reserve command that does not contain a password. As a matter of convenience for explanation, the storage system 100 is referred to as a DKC 1, and the storage system 200 is referred to as a DKC 2.

When the system administrator performs input operations with the management terminal 180 and designates the DKC 1 to conduct an LDEV search of the DKC 2 (S101), the DKC 1 conducts the LDEV search of the DKC 2 (S102). Upon receiving the search results from the DKC 2 (S103), the DKC 1 transfers such search results to the management terminal 180 (S104). The management terminal 180, as shown in the guide screen 301 illustrated in FIG. 8, displays the search results (S105).

Figure 8:
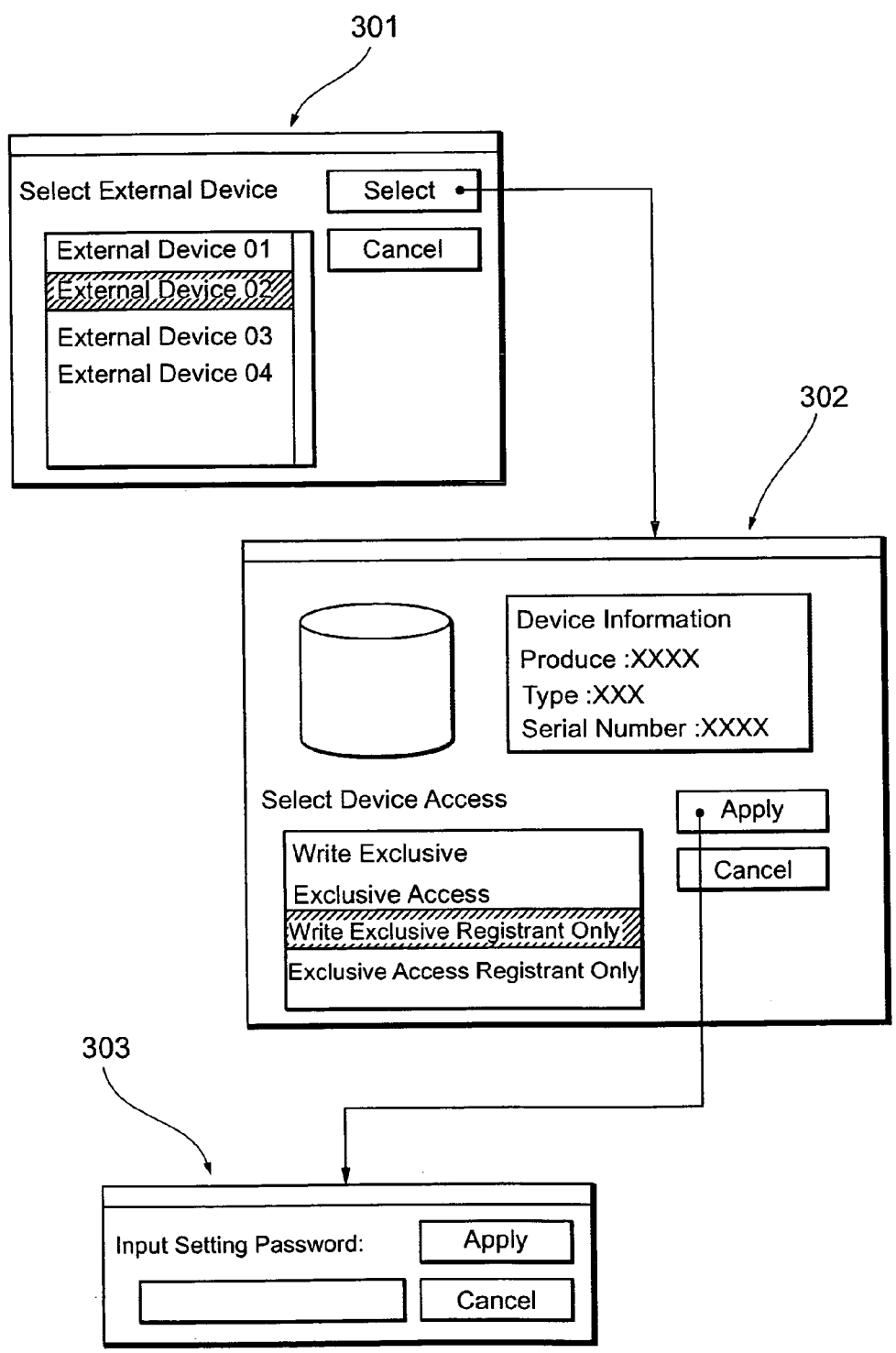
FIG. 8 is an input guide screen of a reserve command.

When the system administrator designates a certain logical device as the logical device to designate access restriction according to the guide screen 301, the management terminal 180, as shown in the guide screen 302 illustrated in FIG. 8, displays the attribute (Write Exclusive/Exclusive Access/ Write Exclusive Registration Only/Exclusive Access Registration) of the access restriction.

When the system administrator selects the access restriction attribute of Write Exclusive or Exclusive Access (S106), a designation for transmitting a reserve command is provided from the management terminal 180 to the DKC 1 (S107). Then, a reserve command is transmitted from the DKC 1 to the DKC 2 (S108). Upon receiving a reply from the DKC 2 (S109), the DKC 1 changes the configuration of the external device (setup of access restriction) (S110), and reports the completion to the management terminal 180 (S111).

Figure 9:
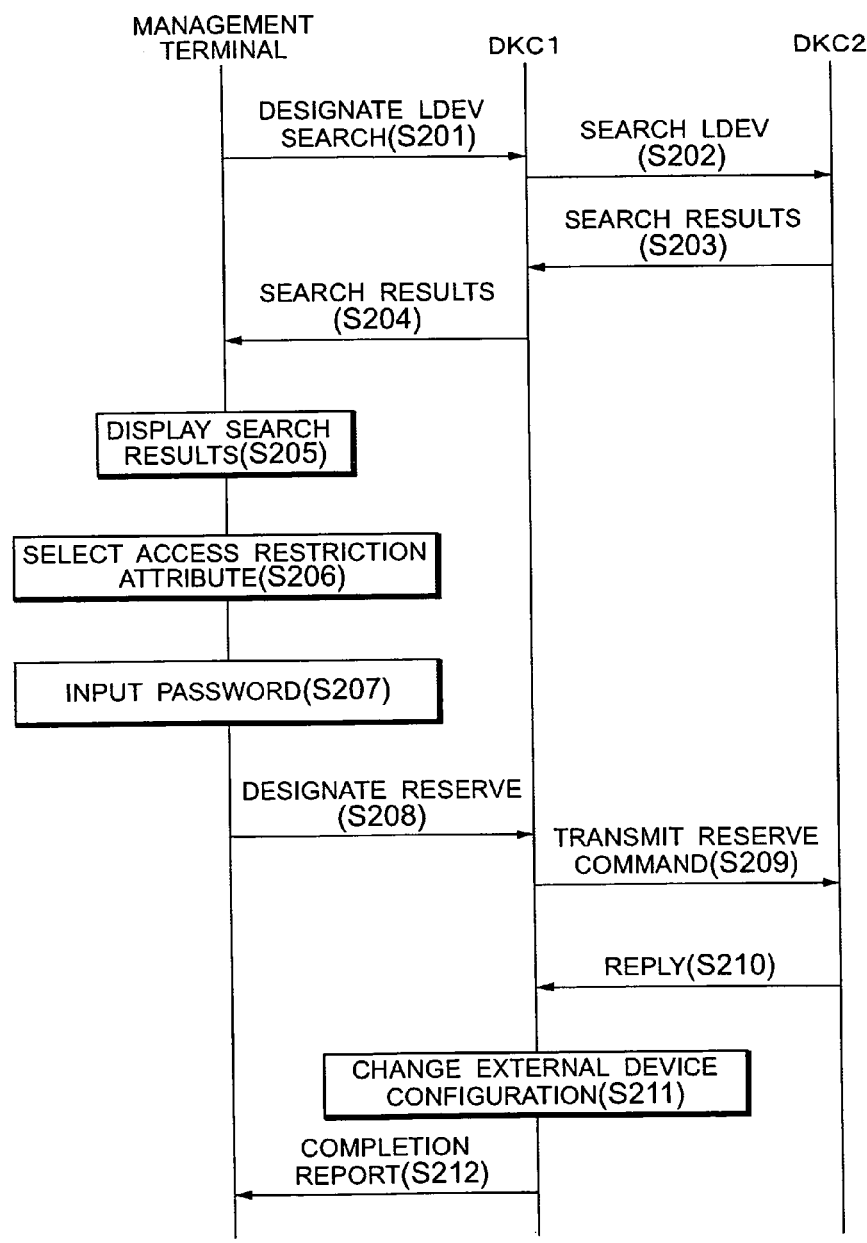
FIG. 9 is a sequence chart showing the procedures for setting the access restriction of a storage system.

FIG. 9 is a sequence chart showing the procedures for setting the access restriction of the storage system 200 using a reserve command containing a password. Since steps S201 to S206, S208 to S212 are the same as steps S101 to S106, S107 to S111 described above, the detailed explanation thereof is omitted.

When the system administrator selects the access restriction of Write Exclusive Registration Only or Exclusive Access Registration Only according to the guide screen 302 illustrated in FIG. 8 (S206), the guide screen of FIG. 8 will be displayed. When the system administrator inputs the password according to the guide screen 303 (S207), a designation for transmitting a reserve command is provided from the management terminal 180 to the DKC 1 (S208).

Figure 10:
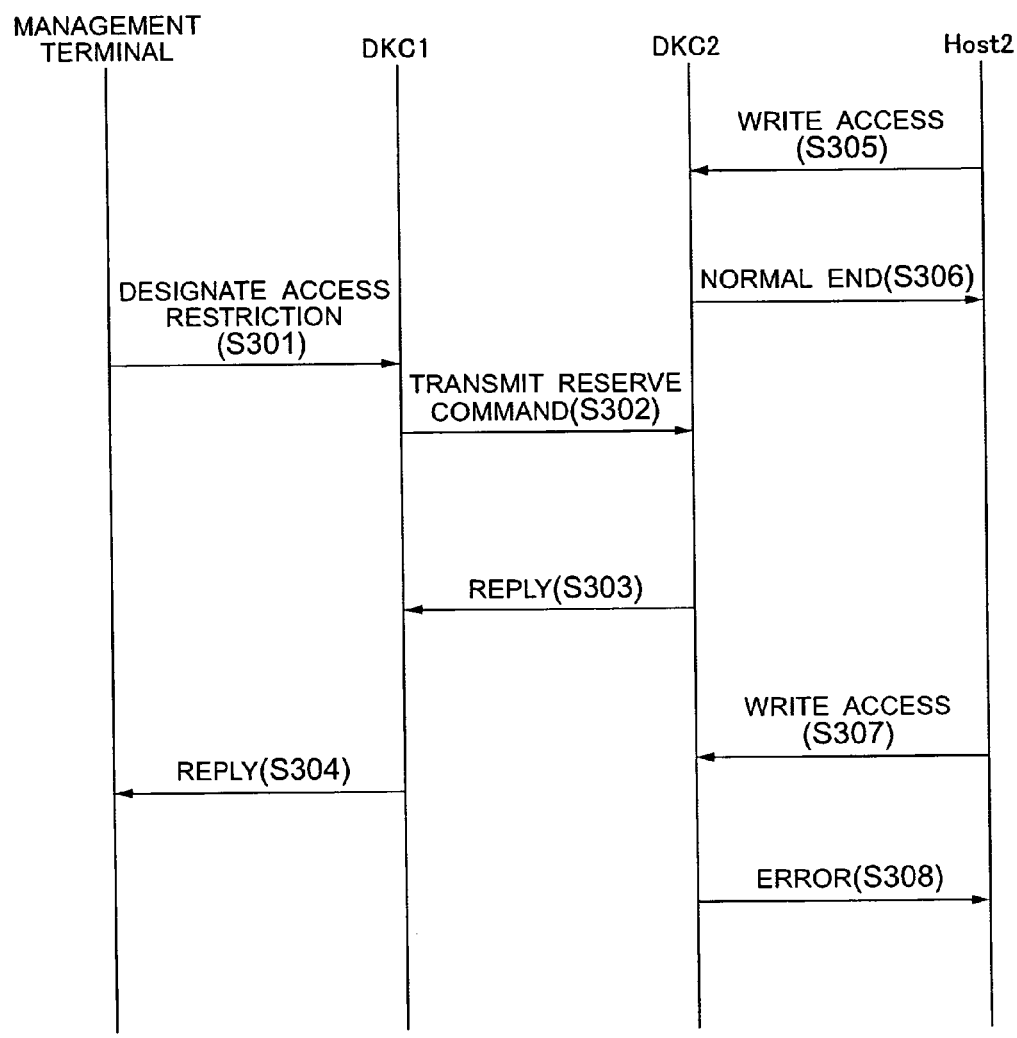
FIG. 10 is an explanatory diagram showing a specific mode of access restriction with the storage system.

FIG. 10 shows the specific mode of access restriction with the storage system 200. As a matter of convenience for explanation, the host system 20 is referred to as a Host 2.

When the access restriction of the DKC 2 is designated from the management terminal 180 (S301), the DKC 1 transmits a reserve command to the DKC 2 (S302). As the attribute of access restriction, any one among Write Exclusive/Exclusive Access/Write Exclusive Registration Only/Exclusive Access Registration may be used. Upon receiving a reply from the DKC 2 (S303), the DKC 1 reports the completion to the management terminal 180 (S304).

When the Host 2 executes write access to the DKC 2 (S305) at the stage before the access restriction of the DKC 2 is set, a reply of normal end will be returned (S306). Nevertheless, even when the Host 2 executes write access to the DKC 2 (S307) at the stage after the access restriction of the DKC 2 is set, an error report will be returned (S308).

Figure 11:
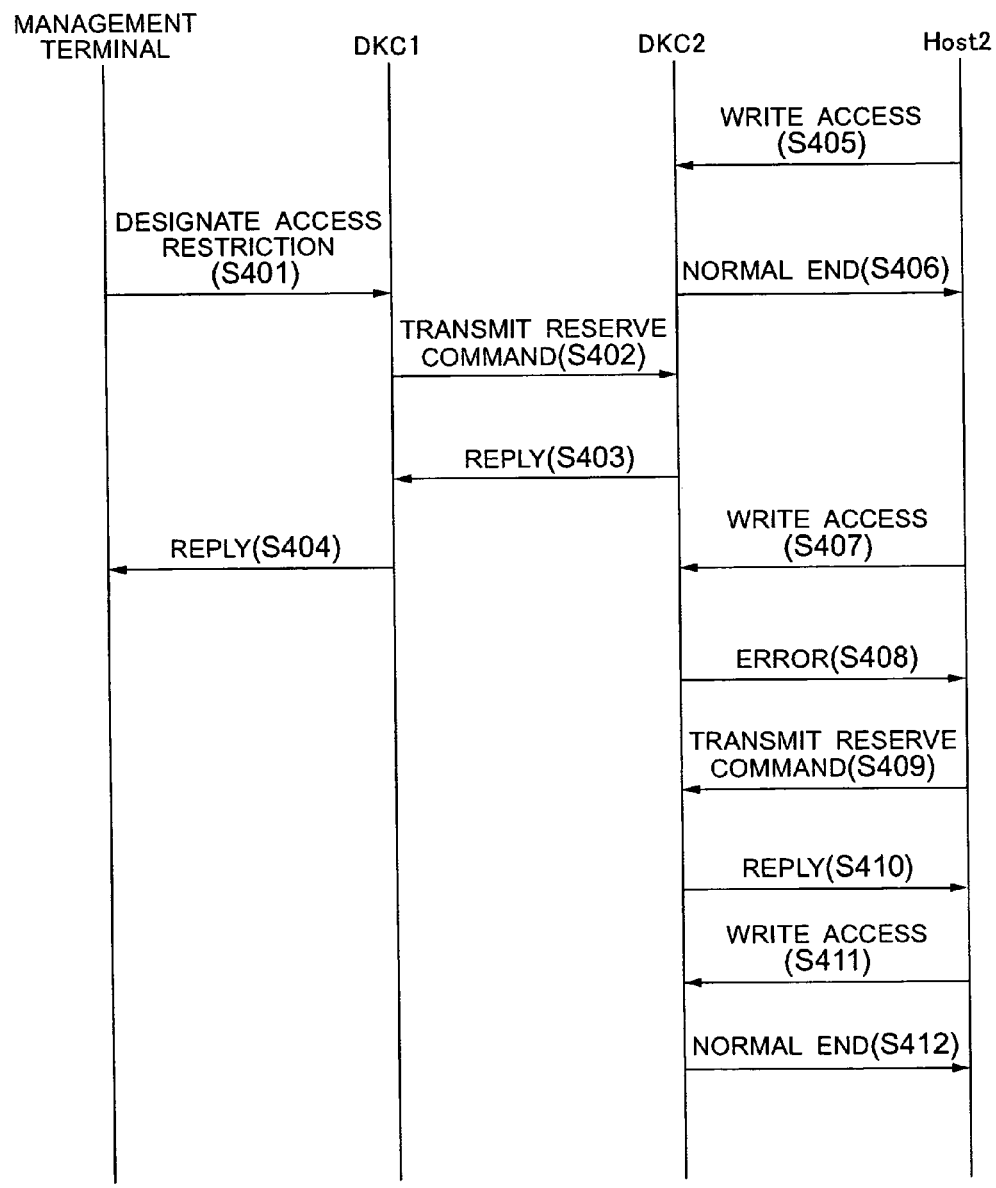
FIG. 11 is an explanatory diagram showing a specific mode of access restriction and transfer of reserve right with the storage system.

FIG. 11 shows a specific mode of the access restriction and reserve right transfer with the storage system 200.

When the access restriction of the DKC 2 is designated from the management terminal 180 (S401), the DKC 1 transmits a reserve command containing a password to the DKC 2 (S402). As the attribute of access restriction, Write Exclusive Registration Only or Exclusive Access Registration Only will be designated. Upon receiving a reply from the DKC 2 (S403), the DKC 1 reports the completion to the management terminal 180 (S404).

When the Host 2 executes write access to the DKC 2 (S405) at the stage before the access restriction of the DKC 2 is set, a reply of normal end will be returned (S406).

Nevertheless, even when the Host 2 executes write access to the DKC 2 (S407) at the stage after the access restriction of the DKC 2 is set, an error report will be returned (S408).

When the DKC 1 uses the same password as the one transmitted to the DKC 2 and the Host 2 transmits a reserve command to the DKC 2 (S409), and receives a reply (S410), the reserve right will be transferred from the DKC 1 to the Host 2. Thereafter, when the Host 2 executes write access to the DKC 2 (S411), a reply of normal end will be returned (S412).

According to the present embodiment, since the host system 10 is able to restrict the writing of data from the host system 20 to the external volume 260 upon writing data in the external volume 260 mapped to the virtual internal volume 191, the consistency of data of the external volume 260 can be guaranteed.

Further, by using a reserve command of a versatile SCSI protocol as the command for designating the access restriction, access restriction can be implemented easily without having to equip the storage system with a special function so as long as it is a SCSI device.

Embodiment 2

Figure 12:
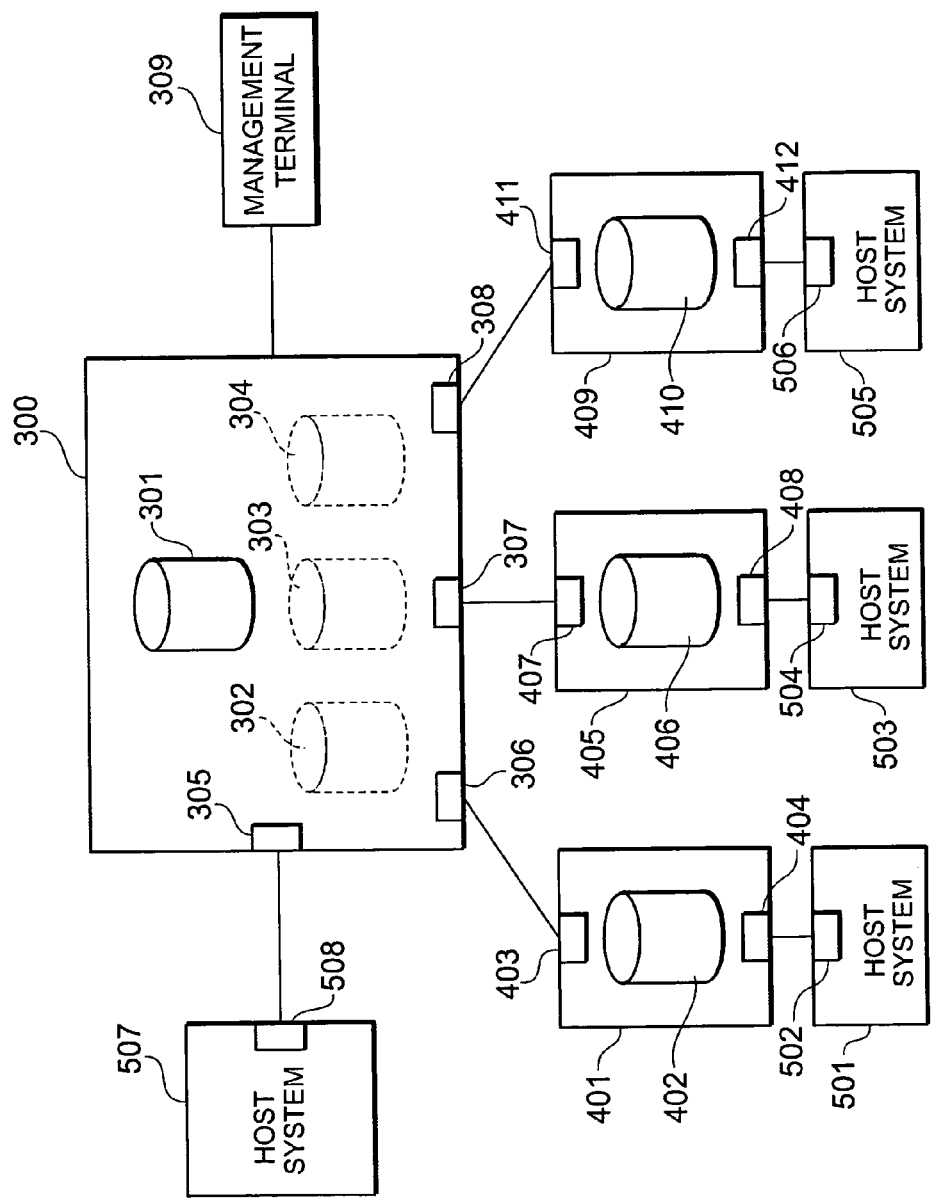
FIG. 12 is a network configuration of the storage system according to Embodiment 2.

FIG. 12 shows a network configuration of the storage system according to the present embodiment. The storage system 300 has an internal volume 301, virtual internal volumes 302, 303, 304, a target port 305 and initiator ports 306, 307, 308.

The internal volume 301 is an actual device having an actual storage area. The virtual internal volumes 302, 303, 304 are virtual existences without an actual storage area, and the substance that stores data exists in the external volumes 402, 406, 410 of the respective storage systems 401, 405, 409. In other words, virtual internal volumes 302, 303, 304 are created by the external volumes 402, 406, 410 of the respective storage systems 401, 405, 409 being mapped to the storage hierarchy of the storage system 300. The storage system 300 incorporates the external volumes 402, 406, 410 as its own internal volume, and provides these as LUs (Logical Units) to the host system 10.

The target port 305 is connected to a port 508 of a host system 507. The initiator ports 306, 307, 308 are connected to the ports 403, 407, 411 of the storage systems 401, 405, 409. The storage systems 401, 405, 409 are respectively connected to the ports 502, 504, 506 of the host systems 501, 503, 505 via the ports 404, 408, 412.

By performing input operations with the management terminal 309 of the storage system 300, the system administrator may restrict the access to the external volumes 402, 406, 410 with the host systems 501, 503, 505 by designating the transmission of the reserve command from the storage system 300 to the storage systems 401, 405, 409.

As the operation of this kind of network connection mode, for instance, the storage system 300 may be installed in the head office, and the storage systems 401, 405, 409 may be installed in the respective branch offices. The data calculated at the respective branch offices during weekdays is written from the host systems 501, 503, 505 in the external volumes 402, 406, 410. And, during the weekend, in order to tabulate the data accumulated in the external volumes 402, 406, 410 at the host system 507, the reserve command is transmitted from the storage system 300 to the storage systems 401, 405, 409, and access by an initiator (for example, host systems 501, 503, 505) other than the storage system 300 to the external volumes 402, 406, 410 is restricted.

As the attribute of access restriction, any one among Write Exclusive, Exclusive Access, Write Exclusive Registration Only, Exclusive Access Registration may be used.

After the tabulation with the host system 507 is completed, the reserve is cancelled, and the host systems 501, 503, 505 of the respective branch offices will be able to access the external volumes 402, 406, 410 once again.

Figure 13:
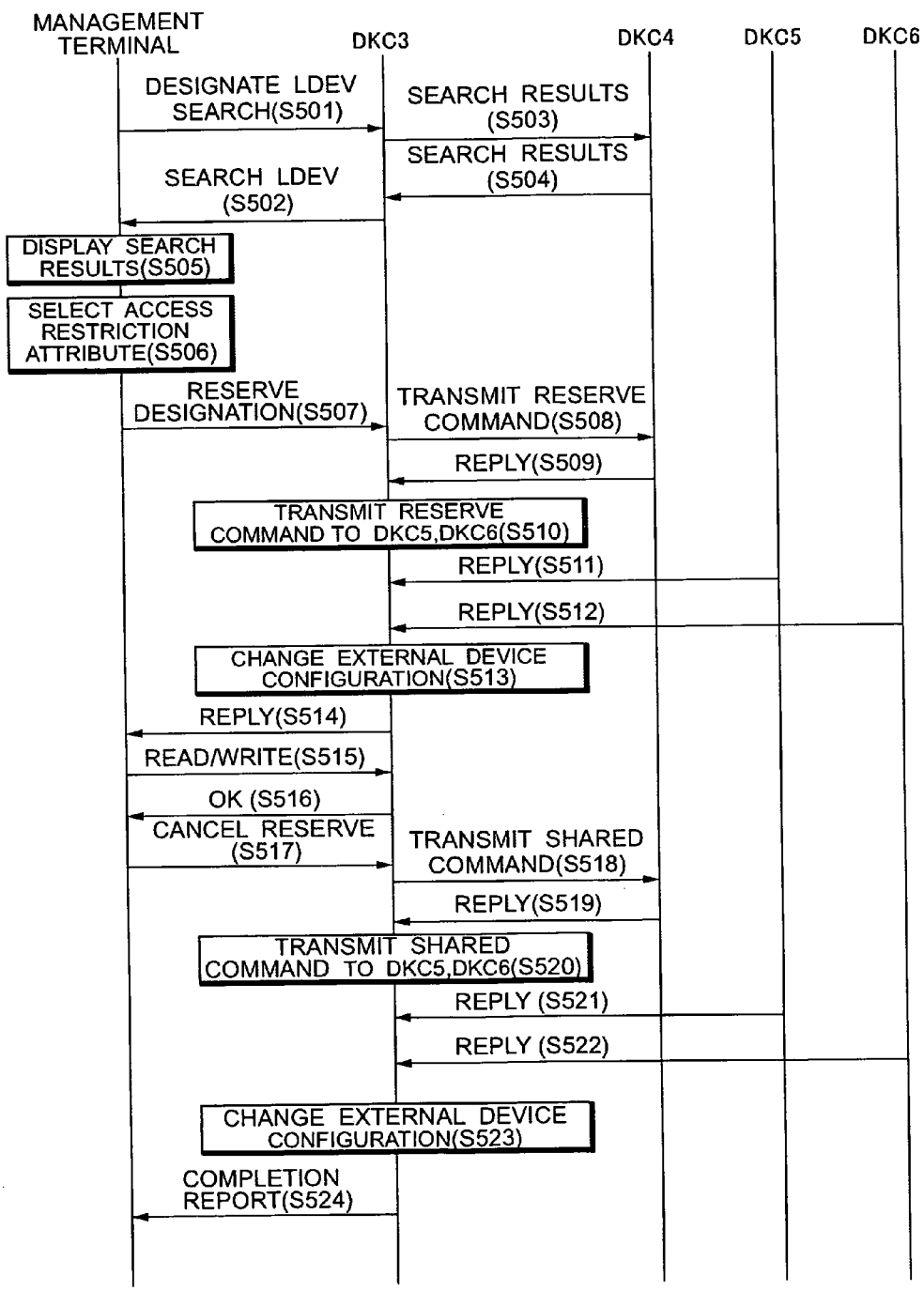
FIG. 13 is a sequence chart showing the procedures for setting the access restriction of a storage system.

FIG. 13 is a sequence chart showing the procedures for setting the access restriction of the storage system. As a matter of convenience for explanation, each of the storage systems 300, 401, 405, 409 is referred to as a DKC 3, DKC 4, DKC 5, DKC 6.

When the system administrator performs input operations with the management terminal 309 and designates the DKC 3 to perform an LDEV search of the DKC 4 (S501), the DKC 3 performs the LDEV search of the DKC 4 (S502). Upon receiving the search results from the DKC 4, the DKC 3 transfers such search results to the management terminal 309 (S504). The management terminal 309, as shown in the guide screen 301 of FIG. 8, displays the search results (S505).

When the system administrator designates a certain logical device as the logical device to designate access restriction according to the guide screen 301, the management terminal 309, as shown in the guide screen 302 illustrated in FIG. 8, displays the attribute (Write Exclusive/Exclusive Access/Write Exclusive Registration Only/Exclusive Access Registration) of the access restriction.

When the system administrator selects the access restriction attribute of Write Exclusive or Exclusive Access (S506), a designation for transmitting a reserve command is provided from the management terminal 309 to the DKC 3 (S507).

Then, a reserve command is transmitted from the DKC 3 to the DKC 4 (S508). Upon receiving a reply from the DKC 4

(S509), the DKC 3 repeats the similar processing steps for the DKC 5, DKC 6 (S510), and receives a reply from the DKC 5, DKC 6 (S511, S512).

Then, the DKC 3 changes the configuration of the external volumes 402, 406, 410 (setup of access restriction) (S513), and reports the completion to the management terminal 309 (S514). Thereby, the access from the host systems 501, 503, 505 to the external volumes 402, 406, 410 will be restricted.

The host system 507 accesses the external volumes 402, 406, 410 via the virtual internal volumes 302, 303, 304 and performs tabulation (S515, S516).

After the tabulation is completed, upon receiving a designation to cancel the reserve from the management terminal 309 (S517), the DKC 3 transmits a shared command to the DKC 4 and cancels the access restriction (S518). Upon receiving a reply from the DKC 4 (S519), the DKC 3 also transmits a shared command to the DKC 5, DKC 6 (S520). Upon receiving a reply from the DKC 5, DKC 6 (S521, S522), the DKC 3 changes the configuration of the external volumes 402, 406, 410 (cancellation of access restriction) (S523), and thereafter reports the completion to the management terminal 309 (S524).

When remote copying for sharing data between the storage system 300 of the headquarters and the storage systems 401, 405, 409 of the respective branch offices is performed, although much time will be required for the copying process, if an externally connected function of the present embodiment is employed, it will not be necessary to spend much time on data sharing since the host system 507 will be able to directly access the external volumes 402, 406, 410.

Further, since the tabulation of data with the host system 507 is conducted upon restricting the access from the host systems 501, 503, 505 to the external volumes 402, 406, 410, the consistency of data in the external volumes 402, 406, 410 can also be guaranteed.

Incidentally, the access restriction from the host systems 501, 503, 505 to the external volumes 402, 406, 410 may be set by the system administrator according to the period of time, or may be automatically set according to the period of time with a program loaded onto the management terminal 309 or storage system 300.

Embodiment 3

Figure 14:
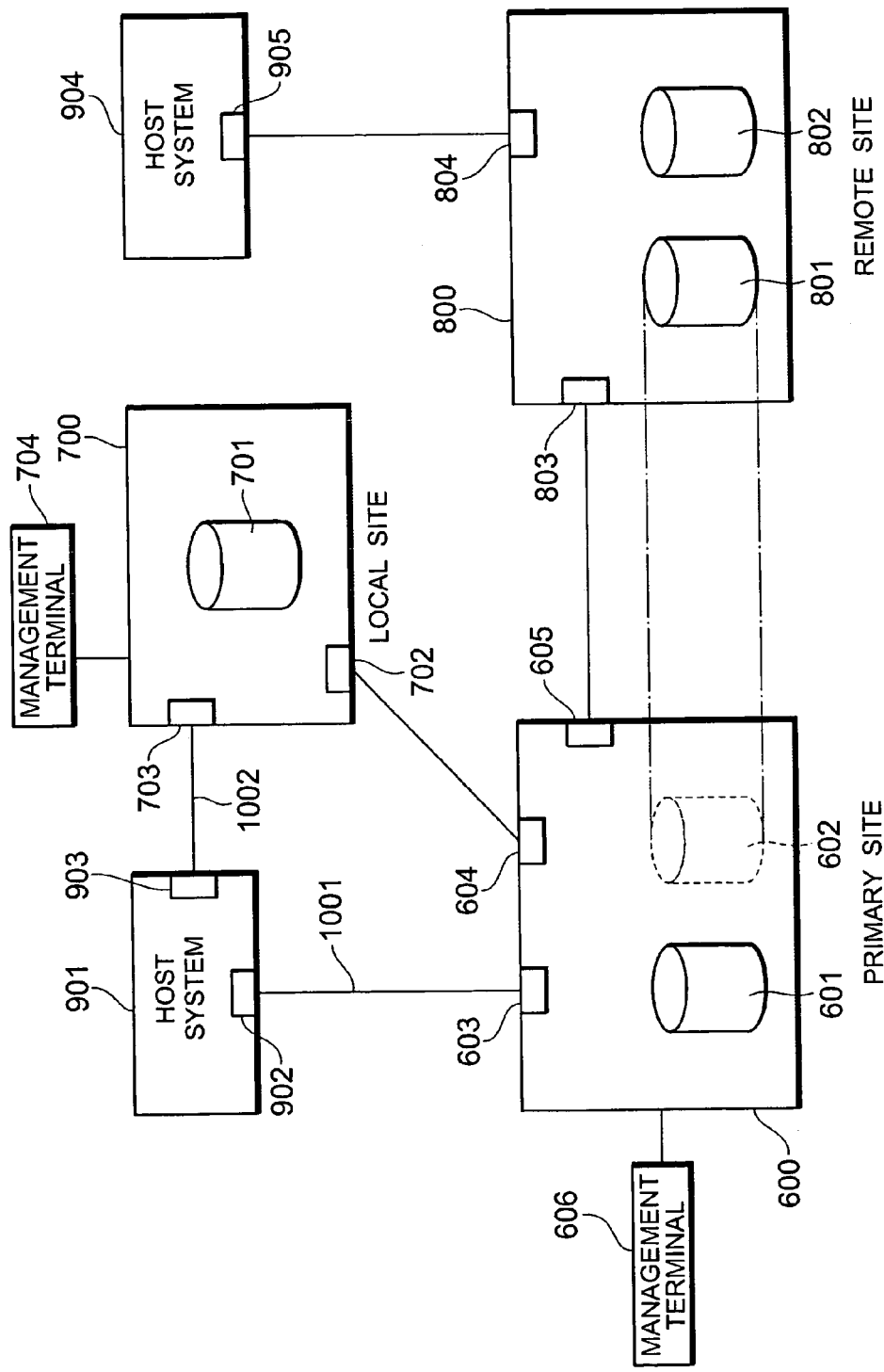
FIG. 14 is a network configuration of the storage system according to Embodiment 3.

FIG. 14 shows a network configuration of the storage system according to the present embodiment. In the present embodiment, in order to improve the fault tolerance against disasters or the like, a common use storage system 600 is installed in a primary site, and standby storage systems 700, 800 are respectively installed in a local site and s remote site. The local site exists at a close distance from the primary site, and the remote site exists at a far distance from the primary site.

The storage system 600 has volumes 601, 602, a target port 603, initiator ports 604, 605 and a management terminal 606.

The volume 601 is an actual device having an actual storage area. The volume 602 is a virtual existence without an actual storage area, and the substance storing data exists in the volume 801 of the storage system 800. In other words, the volume 602 is created by mapping the volume 801 of the storage system 800 to the storage hierarchy of the storage system 600.

A copy pair is formed between the volume 601 and volume 602, and the relationship of the two is that the former is a primary logical volume and the latter is a secondary logical volume. Further, the target port 603 is connected to a port 902 of a host system 901 via a common use path 1001. The initiator ports 604, 605 are respectively connected to the target ports 702, 803 of the storage systems 700, 800.

The storage system 700 has a volume 701, target ports 702, 703 and a management terminal 704. The volume 701 is an actual device having an actual storage area. A copy pair based on a synchronous copy is formed between the volume 601 and volume 701, and the relationship of the two is that the former is a primary logical volume and the latter is a secondary logical volume. The target port 703 is connected to a port 903 of a host system 901 via an alternate path 1002.

The storage system 800 has volumes 801, 802 and target ports 803, 804. The volumes 801, 802 are actual devices having an actual storage area. A copy pair is formed between the volume 801 and volume 802, and the relationship of the two is that the former is a primary logical volume and the latter is a secondary logical volume. The target port 804 is connected to a port 905 of a host system 904.

Meanwhile, since the volume 801 is the storage system 800 is used as an internal device of the storage system 600, when the writing in the volume 801 by the host system 904 is authorized, the consistency of data in the volume 801 cannot be guaranteed. Thus, by issuing a reserve command (Write Exclusive Registration Only or Exclusive Access Registration Only) containing a password from the storage system 600 to the storage system 800, the access to the volume 801 by the host system 904 can be restricted. As a result of conducting this kind of access restriction, access to the volume 801 can only be made by the storage system 600.

Further, as shown in FIG. 15, a case when a disaster or the like arises at the primary site and a failure occurs to the storage system 600 is considered. The host system 901 switches the access path from the common use path 1001 to the alternate path 1002, and continues business by using the storage system 700. Here, in order to duplicate data, the volume 801 of the storage system 800 is mapped to the volume 705 of the storage system 700. The volume 705 is a virtual existence without an actual storage area, and the substance storing data exists in the volume 801 of the storage system 800. In other words, the volume 705 is created by the volume 801 of the storage system 800 being mapped to the storage hierarchy of the storage system 700. A copy pair is formed between the volume 701 and volume 705, and the relationship of the two is that the former is a primary logical volume and the latter is a secondary logical volume.

The host system 901 controls the storage system 700 and uses the same password as the one transmitted from the storage system 600 to the storage system 800 to transmit a reserve command from the storage system 700 to the storage system 800 and transfer the reserve right set in the storage system 800 from the storage system 600 to the storage system 700. Thereby, the storage system 700 may use the storage system 800 as an external storage apparatus. Further, access restriction from the host system 904 to the storage system 800 can also be realized.

We claim:

1. A storage system, comprising:
 a plurality of mapping source storage systems including therein respectively a plurality of logical devices mapped respectively to a plurality of virtual devices provided in a mapping destination storage system, said mapping source storage systems being directly and respectively connected to a plurality of host systems; and
 a management terminal which restricts access by the host systems to the logical devices by transmitting a reserve command from the mapping destination storage system to the mapping source storage systems, wherein, upon receiving a first reserve command containing a first password from said mapping destination storage system, one of said mapping source storage systems reserves an exclusive right to access said virtual device therein to said mapping destination storage system and restricts access from an initiator other than said mapping destination storage system to said logical device as designated in said first reserve command, and wherein, upon receiving a second reserve command containing said first password from an initiator other than said mapping destination storage system after receiving said first reserve command, said one mapping source storage system transfers the exclusive right to access from said mapping destination storage system to said initiator which issues said second reserve command.

2. The storage system according to claim 1, wherein said reserve command is a SCSI command.

3. The storage system according to claim 1, wherein said reserve command has a access restriction attribute of Write Exclusive, Exclusive Access, Write Exclusive Registration Only, or Exclusive Access Registration Only, and
when a certain logical device is designated for access restriction, the management terminal displays the access restriction attribute.

4. The storage system according to claim 1, wherein the management terminal designates the mapping destination storage system to perform an LDEV search of said one mapping source storage system, and the mapping destination storage system performs the LDEV search of said one mapping source storage system,
upon receiving search results from said one mapping source storage system, the mapping destination storage system transfers the search results to the management terminal, and
the management terminal displays the search results.

5. The storage system according to claim 1, wherein when an access restriction attribute is designated for said one mapping source storage system, a designation for transmitting a reserve command is provided from the management terminal to the mapping destination storage system, the reserve command is transmitted from the mapping destination storage system to said one mapping source storage system,
upon receiving a reply from said one mapping source storage system, the mapping destination storage system repeats the processing for the other mapping source storage systems, and receives a reply from each of the other mapping source storage systems, and
the mapping destination storage system sets up access restriction of the logical devices, and reports the completion to the management terminal.

6. The storage system according to claim 5, wherein the mapping destination storage system sets up access restriction for the logical devices, and reports the completion to the management terminal.

7. The storage system according to claim 6, wherein a host system directed connected to the mapping destination storage system accesses the logical devices via the virtual volumes and performs tabulation.

8. The storage system according to claim 7, wherein after the tabulation is completed, upon receiving a designation to cancel the reserve commends from the management terminal, the mapping destination storage system transmits a shared command to said one mapping source storage system and cancels the access restriction.

9. The storage system according to claim 7, wherein upon receiving a reply from said one mapping source storage system, the mapping destination storage system transmits a shared command to the other mapping source storage systems,
upon receiving a reply from the other mapping source storage systems, the mapping destination storage system cancels the access restriction of the logical devices, and then reports the completion to the management terminal.

10. A storage access restriction method for controlling an access to a storage system having a plurality of mapping source storage systems including therein respectively a plurality of logical devices mapped respectively to a plurality of virtual devices provided in a mapping destination storage system, said mapping source storage systems being directly and respectively connected to a plurality of host systems; and a management terminal which restricts access by the host systems to the logical devices by transmitting a reserve command from the mapping destination storage system to the mapping source storage systems, comprising:
receiving a first reserve command containing a first password from said mapping destination storage system;
reserving an exclusive right to access said virtual device to said mapping destination storage system and restricting access from an initiator other than said mapping destination storage system to one of said logical devices as designated in said received first reserve command; and
upon receiving a second reserve command containing said first password from an initiator other than said mapping destination storage system after receiving said first reserve command, transferring the exclusive right to access from said mapping destination storage system to said initiator which issues said second reserve command.

11. The storage access restriction method according to claim 10, wherein said reserve command is a SCSI command.

12. A computer program embedded in a computer readable recording medium for causing a storage system having a plurality of mapping source storage systems including therein respectively a plurality of logical devices mapped respectively to a plurality of virtual devices provided in a mapping destination storage system, said mapping source storage systems being directly and respectively connected to a plurality of host systems; and a management terminal which restricts access by the host systems to the logical devices by transmitting a reserve command from the mapping destination storage system to the mapping source storage systems, comprising:
a module for receiving a first reserve command containing a first password from said mapping destination storage system;
a module for reserving an exclusive right to access said virtual device to said mapping destination storage system and restricting access from an initiator other than said mapping destination storage system to one of said logical devices as designated in said received first reserve command; and
upon receiving a second reserve command containing said first password from an initiator other than said mapping destination storage system after receiving said first reserve command, transferring the exclusive right to access from said mapping destination storage system to said initiator which issues said second reserve command.

13. The computer program according to claim 12, wherein said reserve command is a SCSI command.

* * * * *